United States Patent
Albl et al.

(10) Patent No.: US 11,117,421 B2
(45) Date of Patent: Sep. 14, 2021

(54) WHEEL BEARING ARRANGEMENT FOR A MOTOR VEHICLE

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 353 days.

(21) Appl. No.: 15/919,597

(22) Filed: Mar. 13, 2018

(65) Prior Publication Data

US 2018/0264879 A1 Sep. 20, 2018

(30) Foreign Application Priority Data

Mar. 14, 2017 (DE) .......................... 102017204203.6

(51) Int. Cl.
*B60B 27/00* (2006.01)
*F16C 19/18* (2006.01)
(Continued)

(52) U.S. Cl.
CPC ........ *B60B 27/001* (2013.01); *B60B 27/0015* (2013.01); *B60B 27/0052* (2013.01); *B60B 27/0073* (2013.01); *B60B 27/0094* (2013.01); *B60B 35/128* (2013.01); *B60B 35/18* (2013.01); *F16C 19/183* (2013.01); *F16C 33/586* (2013.01); *F16C 33/7876* (2013.01); *F16C 33/805* (2013.01); *F16D 3/223* (2013.01);
(Continued)

(58) Field of Classification Search
CPC .............. B60B 27/001; B60B 27/0015; B60B 27/0052; B60B 27/0073; B60B 27/0094; F16C 19/183; F16C 33/586; F16C 33/7876; F16C 33/805; F16D 3/223
See application file for complete search history.

(56) References Cited

U.S. PATENT DOCUMENTS

| 2,037,982 A | 4/1936 | Hughes |
| 3,936,105 A | 2/1976 | Asberg |

(Continued)

FOREIGN PATENT DOCUMENTS

| CN | 2411135 Y | 12/2000 |
| CN | 106103129 A | 11/2016 |

(Continued)

OTHER PUBLICATIONS

NSK, "Hub Unit Bearings", CAT. No. E4201b 2007 C-7, NSK Ltd. 2001, p. 40. (Year: 2001).*

(Continued)

*Primary Examiner* — Kip T Kotter
(74) *Attorney, Agent, or Firm* — Maier & Maier, PLLC (57) ABSTRACT

A wheel bearing arrangement for a motor vehicle with a wheel hub and a wheel bearing for the rotatable bearing of the wheel hub at a wheel mount. The wheel bearing has an outer ring and an inner ring, which is rotatable with respect to the outer ring around an axis of rotation and is connected to the wheel hub. A wheel flange extends from the wheel hub and, as viewed in the axial direction, has a brake disk mount, which is open in the direction facing away from the outer ring and which, as viewed in longitudinal section with respect to the axis of rotation, is formed by a recess of the wheel flange, and has a support surface for a brake disk.

10 Claims, 3 Drawing Sheets

(51) Int. Cl.
| | |
|---|---|
| *F16C 33/80* | (2006.01) |
| *F16D 65/12* | (2006.01) |
| *B60B 35/12* | (2006.01) |
| *F16C 33/78* | (2006.01) |
| *F16D 3/223* | (2011.01) |
| *F16C 33/58* | (2006.01) |
| *B60B 35/18* | (2006.01) |
| *B60B 27/06* | (2006.01) |
| *F16C 35/06* | (2006.01) |
| *B60B 27/02* | (2006.01) |

(52) U.S. Cl.
CPC ........ *F16D 65/123* (2013.01); *B60B 27/0005* (2013.01); *B60B 27/0036* (2013.01); *B60B 27/02* (2013.01); *B60B 27/06* (2013.01); *B60B 2380/14* (2013.01); *B60B 2380/73* (2013.01); *B60B 2900/114* (2013.01); *F16C 19/186* (2013.01); *F16C 35/06* (2013.01); *F16C 2326/02* (2013.01); *F16D 2003/22326* (2013.01)

(56) References Cited

U.S. PATENT DOCUMENTS

| | | | |
|---|---|---|---|
| 3,944,305 A | 3/1976 | Asberg | |
| 5,438,260 A * | 8/1995 | Rigaux | G01P 3/443 324/166 |
| 5,813,675 A | 9/1998 | Otto | |
| 8,708,570 B2 | 4/2014 | Mitsuru et al. | |
| 8,979,385 B2 * | 3/2015 | Haepp | F16C 33/583 384/480 |
| 9,689,431 B2 * | 6/2017 | Walter | F16C 33/7896 |
| 2005/0099058 A1 | 5/2005 | Hayato | |
| 2006/0033381 A1 | 2/2006 | Hiroto | |
| 2018/0195552 A1 * | 7/2018 | Albl | F16C 19/182 |

FOREIGN PATENT DOCUMENTS

| | | | |
|---|---|---|---|
| DE | 2 248 012 A1 | 10/1973 | |
| DE | 10132429 A1 | 2/2002 | |
| DE | 10 2011 003 704 A1 | 8/2012 | |
| DE | 10 2015 211 456 A1 | 12/2016 | |
| DE | 102017200338 A1 | 4/2017 | |
| EP | 2 634 012 A1 | 9/2013 | |
| EP | 2685119 A1 | 1/2014 | |
| EP | 3 351 403 A1 | 7/2018 | |
| JP | 2003-240003 A | 8/2003 | |
| JP | 2003262231 A * | 9/2003 | F16C 33/7876 |
| JP | 2004068844 A * | 3/2004 | F16C 33/7876 |
| JP | 2005-147298 A | 6/2005 | |
| JP | 201060126 A | 3/2010 | |
| JP | 2010065800 A * | 3/2010 | F16C 33/805 |
| JP | 2010-106925 A | 5/2010 | |

OTHER PUBLICATIONS

Examination Report dated Nov. 8, 2017 of corresponding German Application No. 102017204203.6; 8 pgs.
Search Report dated Jan. 25, 2019 in corresponding European Application No. 18159814.5, 14 pages with partial machine-generated English-language translation.
Chinese Office Action dated Oct. 21, 2020, in connection with corresponding CN Application No. 201810209564.4 (14 pp., including machine-generated English translation).
Chinese Office Action dated Apr. 9, 2021, in connection with corresponding CN Application No. 201810209564.4 (15 pp., including machine-generated English translation).

* cited by examiner

WHEEL BEARING ARRANGEMENT FOR A MOTOR VEHICLE

FIELD

The invention relates to a wheel bearing arrangement for a motor vehicle, with a wheel hub and a wheel bearing for rotatable bearing of the wheel hub at a wheel mount, wherein the wheel bearing has an outer ring and an inner ring, which can rotate around an axis of rotation with respect to the outer ring and is connected to the wheel hub, wherein a wheel flange extends from the wheel hub and, as viewed in the axial direction, has a brake disk mount that is open in the direction facing away from the outer ring and is formed, as viewed in the longitudinal section with respect to the axis of rotation, by a recess of the wheel flange and has a support surface for a brake disk.

BACKGROUND

The wheel bearing arrangement serves for the rotatable bearing of at least one wheel at a chassis of the motor vehicle. In this case, the wheel bearing arrangement is preferably a component of a wheel suspension, which serves for the suspension, in particular the spring suspension, of the wheel with respect to the chassis. The wheel is mounted rotatably at the wheel mount of the wheel bearing arrangement. For this purpose, the wheel can be attached at the wheel flange, which is connected to the wheel hub, which, ultimately, is mounted rotatably by means of the wheel bearing at the wheel mount. The wheel bearing is equipped with the inner ring and the outer ring. It is preferably present as a roller bearing, in particular as a single-row or multi-row roller bearing, so that roller elements, which are arranged in only one row or in a plurality of rows, are arranged between the inner ring and the outer ring, for a reduction in friction.

The outer ring is fastened or can be fastened at the wheel mount, whereas the inner ring is connected to or can be connected to the wheel hub and consequently to the wheel flange. The inner ring can be designed in one piece and/or as a uniform material with the wheel hub and/or the wheel flange and, in this regard, can therefore be integrated into it. Obviously, it is also possible to provide a plurality of inner rings, wherein one or a plurality of these inner rings can be constructed separately from the wheel hub or—alternatively—can be constructed in one piece or as a uniform material with the wheel hub. Therefore, at least one of the inner rings—for example, exactly one of the inner rings—can be integrated in the wheel hub, whereas another of the inner rings can be formed separately from the wheel flange and subsequently fastened to it.

SUMMARY

The object of the invention is to propose a wheel bearing arrangement for a motor vehicle, which, in comparison to known wheel bearing arrangements, has advantages, and, in particular, has a narrow design in the axial direction with respect to the axis of rotation, in particular in comparison to known wheel bearing arrangements. Preferably, the wheel bearing arrangement can be combined with a given universal joint shaft flange and can be dimensioned correspondingly. In this case, the universal joint shaft flange is present, for example, in the form of an outer or lateral joint of a universal joint shaft or has such a lateral joint.

The object is achieved in accordance with the invention with a wheel bearing arrangement. It is provided that, at the wheel hub, a universal joint shaft flange is fastened, which has a flange front-side surface for resting against a wheel hub front-side surface of the wheel hub, wherein, between the flange front-side surface and an articulation point of the universal joint shaft flange in the axial direction, there is a universal joint shaft flange distance $A_{GW}$. Additionally or alternatively, between the inner-lying end of the wheel hub of the vehicle, in particular the wheel hub front-side surface, and the support surface in the axial direction, there is a standard bearing width $B_{BS}$. Furthermore, it can be provided that, in the wheel flange on its side that faces the outer ring in the axial direction, a seal mount space is formed, which has a seal mount width $B_D$ in the axial direction.

In another embodiment, it is provided that, as viewed in longitudinal section, the recess has a cranking width $B_K$. Additionally or alternatively, the outer ring can have an outer ring width $B_{RL}$. In addition, in another embodiment of the invention, it can be provided that, at the seal mount space, there is an adjoining air gap, which, as viewed in longitudinal section, has an air gap width $B_{VD}$. Through the recess, an outer circumferential surface of the wheel flange preferably forms a brake disk seat, which, with respect to the axis of rotation, has a brake disk seat diameter $D_{BF}$. Alternatively or additionally, it can be provided that, on its outside, the universal joint shaft flange has a universal joint shaft flange diameter $D_{GA}$.

Furthermore, it can be provided that the universal joint shaft flange has a spherical circle diameter $D_{GW}$. A preferred embodiment of the invention provides that the outer ring has a wheel bearing outer diameter $D_{RA}$. Additionally or alternatively, it can be provided that roller elements of the wheel bearing are arranged with their respective center of rotation on a pitch circle with a pitch circle diameter $D_{TK}$. Additionally or alternatively, it is provided that, in a flange mount for the universal joint shaft flange, the wheel hub has a toothing with a toothing diameter $D_{VZ}$.

Another preferred embodiment of the invention provides that the seal mount space has a seal mount spatial height $H_D$. A preferred embodiment of the invention provides that the outer circumferential surface is spaced apart from an inner circumferential surface, which delimits the seal mount space outward in the radial direction, by a flange cross section $Q_F$. Additionally or alternatively, it can be provided that, at the outer ring, in particular in the brake disk mount, at least one fastening means mount is arranged on a wheel bolt circle with a wheel bolt circle diameter $D_{LK}$.

Of special importance are three different embodiments of the wheel bearing arrangement. Thus, in a first embodiment and in a second embodiment, the wheel bearing arrangement comprises both the wheel hub and the wheel bearing and also a universal joint shaft, which has the universal joint shaft flange. In the scope of the first embodiment, the flange front-side surface and the wheel hub front-side surface, which preferably is formed by a flanging of the wheel hub, are intended to rest against each other. In this case, the wheel bearing is tensioned against the universal joint shaft flange and/or against a universal joint shaft pin by means of a screw, for example.

In the second embodiment, the flange front-side surface and the wheel hub front-side surface do not rest against each other; that is, they are arranged spaced apart at least in regions thereof and, in particular, completely. Preferably, therefore, a gap is present between the two surfaces. An embodiment of this kind may be present, provided that the wheel bearing is self-supporting, that is, provided that the flanging of the wheel hub is sufficient for the pretensioning. In this regard, no additional pretensioning is created by way of a pretensioning of the wheel bearing with the universal joint shaft or with the universal joint shaft flange.

In a third embodiment of the wheel bearing arrangement, in contrast, (only) the wheel hub and the wheel bearing are provided, whereas the universal joint shaft or the universal joint shaft flange is not present. This is the case, for example, for a non-driven wheel axle with self-supporting wheel bearing.

The first embodiment preferably relates to a wheel bearing arrangement for a motor vehicle with a wheel hub and to a wheel bearing for rotatable bearing of the wheel hub at a wheel mount, wherein the wheel bearing has at least one outer ring and an inner ring, which is rotatable around an axis of rotation with respect to the outer ring inner ring and is connected to the wheel hub, wherein a wheel flange extends from the wheel hub and, as viewed in the axial direction, has a brake disk mount that is open in the direction facing away from the outer ring and, as viewed in longitudinal section with respect to the axis of rotation, is formed by a recess of the wheel flange and has a support surface for a brake disk, and wherein, at the wheel hub, a universal joint shaft flange is fastened, which has a flange front-side surface for resting against a wheel hub front-side surface of the wheel hub, wherein, between the flange front-side surface and an articulation point of the universal joint shaft flange in the axial direction, a universal joint shaft flange distance is present, and wherein, between the inner-lying end of the wheel hub of the vehicle, in particular the wheel hub front-side surface, and the support surface in the axial direction, a standard bearing width is present, and wherein, in the wheel flange on its side that faces the outer ring in the axial direction, a seal mount space is formed, which, in the axial direction, has a seal mount width, and wherein, as viewed in longitudinal section, the recess has a cranking width, and wherein the outer ring has an outer ring width, and wherein, at the seal mount space, there is an adjoining air gap, which, as viewed in longitudinal section, has an air gap width, and wherein, preferably through the recess, an outer circumferential surface of the wheel flange forms a brake disk seat, which has a brake disk seat diameter with respect to the axis of rotation, and wherein, on its outer side, the universal joint shaft flange has a universal joint shaft flange diameter, and wherein the universal joint shaft flange has a spherical circle diameter, and wherein the outer ring has a wheel bearing outer diameter, and wherein roller elements of the wheel bearing are arranged with their respective center of rotation on a pitch circle with a pitch circle diameter, and wherein, in a flange mount for the universal joint shaft flange, the wheel hub has a toothing with a toothing diameter, and wherein the seal mount space has a seal mount spatial height, and wherein the outer circumferential surface is spaced apart from an inner circumferential surface, which delimits the seal mount space outward in the radial direction, by a flange cross section, and wherein, at the wheel flange, in particular in the brake disk mount, at least one mount for a fastening means is arranged on a wheel bolt circle with a wheel bolt circle diameter.

The second embodiment further preferably relates to a wheel bearing arrangement for a motor vehicle with a wheel hub and a wheel bearing for rotatable bearing of the wheel hub at a wheel mount, wherein the wheel bearing has at least one outer ring and an inner ring, which is rotatable around an axis of rotation with respect to the outer ring and is connected to the wheel hub, wherein a wheel flange extends from the wheel hub, and, as viewed in the axial direction, has a brake disk mount, which is open in the direction facing away from the outer ring and, as viewed in the longitudinal section with respect to the axis of rotation, is formed by a recess of the wheel flange and has a support surface for a brake disk, and wherein, between the inner-lying end of the wheel hub of the vehicle, in particular the wheel hub front-side surface, and the support surface in the axial direction, a standard bearing width is present, and wherein, in the wheel flange on its side that faces the outer ring, a seal mount space is formed in the axial direction, which has a seal mount width in the axial direction, and wherein the recess, as viewed in the longitudinal section, has a cranking width, and wherein the outer ring has an outer ring width, and wherein, at the seal mount space, there is an adjoining air gap, which, as viewed in the longitudinal section, has an air gap width, and wherein preferably, through the recess, an outer circumferential surface of the wheel flange forms a brake disk seat, which has a brake disk seat diameter with respect to the axis of rotation, and wherein, on its outer side, the universal joint shaft flange has a universal joint shaft flange diameter, and wherein the universal joint shaft flange has a spherical circle diameter, and wherein the outer ring has a wheel bearing outer diameter, and wherein roller elements of the wheel bearing are arranged with their respective center of rotation on a pitch circle with a pitch circle diameter, and wherein, in a flange mount for the universal joint shaft flange, the wheel hub has a toothing with a toothing diameter, and wherein the seal mount space has a seal mount spatial height, and wherein the outer circumferential surface is spaced apart, by a flange cross section, from an inner circumferential surface, which delimits the seal mount space outward in the radial direction, and wherein, at the wheel flange, in particular in the brake disk mount, at least one fastening means mount is arranged on a wheel bolt circle with a wheel bolt circle diameter.

Finally, the third embodiment preferably relates to a wheel bearing arrangement for a motor vehicle with a wheel hub and a wheel bearing for rotatable bearing of the wheel hub at a wheel mount, wherein the wheel bearing has at least one outer ring and an inner ring, which is rotatable around an axis of rotation with respect to the outer ring and is connected to the wheel hub, wherein a wheel flange extends from the wheel hub, which, as viewed in the axial direction, has a brake disk mount that is open in the direction facing away from the outer ring, and, as viewed in the longitudinal section with respect to the axis of rotation, is formed by a recess of the wheel flange and has a support surface for a brake disk, and wherein, between the inner-lying end of the wheel hub of the vehicle, in particular the wheel hub front-side surface and the support surface in the axial direction, a standard bearing width is present and wherein, in the wheel flange on its side that faces the outer ring in the axial direction, a seal mount space is formed, which, in the axial direction, has a seal mount width, and wherein the recess, as viewed in the longitudinal section, has a cranking width, and wherein the outer ring has an outer ring width, and wherein, at the seal mount space, there is an adjoining air gap which, as viewed in the longitudinal section, has an air gap width, and wherein preferably, through the recess, an outer circumferential surface of the wheel flange forms a brake disk seat, which has a brake disk seat diameter with respect to the axis of rotation, and wherein the outer ring has a wheel bearing outer diameter, and wherein roller elements of the wheel bearing are arranged with their respective center of rotation on a pitch circle with a pitch circle diameter, and wherein the seal mount space has a seal mount spatial height, and wherein the outer circumferential surface is spaced apart, by a flange cross section, from an inner circumferential surface, which delimits the seal mount space outward in the radial direction, and wherein, at the wheel flange, in particular in the brake disk mount, at least one fastening means mount is arranged on a wheel bolt circle with a wheel bolt circle diameter.

It is then provided for the different embodiments of the wheel bearing arrangement, that is, in particular the first embodiment, the second embodiment, and/or the third embodiment, that the ratio of the universal joint shaft flange distance $A_{GW}$ to the standard bearing width $B_{BS}$ is greater than or equal to 0.5 and/or that the ratio of the sum of the universal joint shaft flange distance $A_{GW}$ and the standard bearing width $B_{BS}$ to the wheel bolt circle diameter $D_{LK}$ is less than or equal to 1.0, and/or that the ratio of the sum of the universal joint shaft flange distance $A_{GW}$ and the standard bearing width $B_{BS}$ to the toothing diameter $D_{VZ}$ is greater than or equal to 2.5, and/or that the ratio of the sum of the universal joint shaft flange distance $A_{GW}$ and the standard bearing width $B_{BS}$ to the pitch circle diameter $D_{TK}$ is greater than or equal to 1.2, and/or that the ratio of the universal joint shaft flange distance $A_{GW}$ to the pitch circle diameter $D_{TK}$ is less than or equal to 0.6, and/or that the ratio of the brake disk seat diameter $D_{BI}$ to the outer ring width $B_{RL}$ is greater than or equal to 1.9, and/or that the ratio of the brake disk seat diameter $D_{BI}$ to the pitch circle diameter $D_{TK}$ is greater than or equal to 1.2, and/or that the ratio of the brake disk seat diameter $D_{BI}$ to the toothing diameter $D_{VZ}$ is greater than or equal to 2.5, and/or that the ratio of the universal joint shaft flange diameter $D_{GA}$ to the wheel bearing outer diameter $D_{RA}$ is greater than or equal to 0.8, and/or that the ratio of the universal joint shaft flange diameter $D_{GA}$ to the pitch circle diameter $D_{TK}$ is greater than or equal to 1.2, and/or that the ratio of the spherical circle diameter $D_{GW}$ to the pitch circle diameter $D_{TK}$ is greater than or equal to 0.7, and/or that the ratio of the spherical circle diameter $D_{GW}$ to the toothing diameter $D_{VZ}$ is greater than or equal to 1.8, and/or that the ratio of the wheel bolt circle diameter $D_{LK}$ to the outer ring width $B_{RL}$ is greater than or equal to 2.0, and/or that the ratio of the wheel bolt circle diameter $D_{LK}$ to the pitch circle diameter $D_{TK}$ is greater than or equal to 1.4, and/or that the ratio of the wheel bolt circle diameter $D_{LK}$ to the toothing diameter $D_{VZ}$ is greater than or equal to 3.3, and/or that the seal mount spatial width $B_D$ is greater than or equal to 2.0 mm, and/or that the cranking width $B_K$ is greater than or equal to 5.0 mm, and/or that the air gap width $B_{VD}$ is less than or equal to 2.0 mm, and/or that the flange cross section $Q_F$ is greater than or equal to 6.0 mm For better clarity, the relations mentioned below are defined:
1. $A_{GW}/B_{BS}$
2. $(A_{GW}+B_{BS})/D_{LK}$
3. $(A_{GW}+B_{BS})/D_{VZ}$
4. $(A_{GW}+B_{BS})/D_{TK}$
5. $A_{GW}/D_{TK}$
6. $D_{BI}/B_{RL}$
7. $D_{BI}/D_{TK}$
8. $D_{BI}/D_{VZ}$
9. $D_{GA}/D_{RA}$
10. $D_{GA}/D_{TK}$
11. $D_{GW}/D_{TK}$
12. $D_{GW}/D_{VZ}$
13. $D_{LK}/B_{RL}$
14. $D_{LK}/D_{TK}$
15. $D_{LK}/D_{VZ}$
16. $B_D$
17. $B_K$
18. $B_{VD}$
19. $Q_F$ The following advantageous ranges of values apply to the relations:
1. greater than or equal to 0.5, preferably greater than 0.5, more preferably greater than or equal to 0.6, in particular greater than or equal to 0.7;
2. less than or equal to 1.0, in particular less than 1.0, preferably less than or equal to 0.95, more preferably less than or equal to 0.9;
3. greater than or equal to 2.5, in particular greater than 2.5, preferably greater than or equal to 2.75, more preferably greater than or equal to 3;
4. greater than or equal to 1.2, in particular greater than 1.2, preferably greater than or equal to 1.3, more preferably greater than or equal to 1.4;
5. less than or equal to 0.6, in particular less than 0.6, preferably less than or equal to 0.55, more preferably less than or equal to 0.5;
6. greater than or equal to 1.9, in particular greater than 1.9, preferably greater than or equal to 2.0, more preferably greater than or equal to 2.1;
7. greater than or equal to 1.2, in particular greater than 1.2, preferably greater than or equal to 1.3;
8. greater than or equal to 2.5, in particular greater than 2.5, preferably greater than or equal to 2.7, particularly preferred greater than or equal to 2.9;
9. greater than or equal to 0.8, in particular greater than 0.8, preferably greater than or equal to 0.9, more preferably greater than or equal to 1.0;
10. greater than or equal to 1.2, in particular greater than 1.2, preferably greater than or equal to 1.3, more preferably greater than or equal to 1.4;
11. greater than or equal to 0.7, in particular greater than 0.7, preferably greater than or equal to 0.8, more preferably greater than or equal to 0.9;
12. greater than or equal to 1.8, in particular greater than 1.8, preferably greater than or equal to 1.9, more preferably greater than or equal to 2.0;
13. greater than or equal to 2.0, in particular greater than 2.0, preferably greater than or equal to 2.4, more preferably greater than or equal to 2.8;
14. greater than or equal to 1.4, in particular greater than 1.4, preferably greater than or equal to 1.6, more preferably greater than or equal to 1.7;
15. greater than or equal to 3.3, in particular greater than 3.3, preferably greater than or equal to 3.5, more preferably greater than or equal to 3.7;
16. greater than or equal to 2.0 mm, in particular greater than 2.0 mm, preferably greater than or equal to 3.0 mm, more preferably greater than or equal to 4.0 mm;
17. greater than or equal to 5 mm, in particular greater than 5.0 mm, preferably greater than or equal to 6.0 mm, more preferably greater than or equal to 7.0 mm;
18. less than or equal to 2.0 mm, in particular less than 2.0 mm, preferably less than or equal to 1.5 mm, more preferably less than or equal to 1.0 mm;
19. greater than or equal to 6.0 mm, in particular greater than 6.0 mm, preferably greater than or equal to 8.0 mm, more preferably greater than or equal to 8.0 mm, more preferably greater than or equal to 10.0 mm.

The wheel bearing arrangement realizes at least one of the mentioned relations with the respective value belonging to this relation. Preferably, a plurality of the mentioned relations with the associated value, more preferably all of the mentioned relations with the associated value, are realized. The respective relation constitutes, together with the associated value, a condition. Provided that, in the scope of this description, such a condition is being addressed, the corresponding relation with the respective value is always meant.

Provided that, in the scope of this description, one of the mentioned conditions is mentioned, this is always understood to mean that the value associated with the corresponding condition is also included. If it is mentioned, purely by way of example, that the condition 1 is to be met, then not only the ratio of the universal joint shaft flange distance $A_{GW}$ to the standard bearing width $B_{BS}$ is referred to, but, at the same time, it is clear that this ratio is to be greater than or equal to 0.5, in particular greater than 0.5, preferably greater than or equal to 0.6, more preferably greater than or equal to 0.7. This applies analogously for the other conditions and relations.

In the introduction, it was already mentioned that the brake disk mount is formed by way of the recess of the wheel flange, so that, ultimately, a cranking is present and the wheel flange is designed as a cranked wheel flange. For realization of the cranking, the relation 14 with the associated value is of importance, in particular, so that said relation is regarded as especially significant. In particular, the condition 14 alone, that is, without the other conditions, can be realized.

Provided that the condition 14 is met, it is additionally advantageous to meet the condition 15. As an advantageous result, the condition 13 can be obtained from this, because the outer ring width $B_{RL}$ can be less than usually is the case. In addition, from the condition 13, a small total width of the wheel bearing arrangement, that is, a small standard bearing width $B_{BS}$, in relation to the given lateral joint of the universal joint shaft is obtained, which is ultimately the goal. Accordingly, the condition 1 is also met advantageously. If the conditions 1, 13, 14, and 15 are met, then, additionally or alternatively, at least one of the conditions 2, 3, and 4, preferably the conditions 2 and 3, the conditions 2 and 4 or the conditions 3 and 4, more preferably the conditions 2, 3, and 4, can be met.

Additionally or alternatively to the aforementioned conditions, the conditions 6, 7, and 8 can be met, because the brake disk seat diameter $D_{BI}$ is dependent at least partially on the wheel bolt circle diameter $D_{LK}$. In this conjunction, the condition 19 can additionally be met.

Because, the seal mount space is formed in the wheel flange, a minimum dimensioning may be necessary for the seal mount spatial width $B_D$, so that preferably the condition 16 is met. Furthermore, it may be appropriate, additionally or alternatively to the aforementioned conditions, to meet the condition 18 in order to realize an adequate clearance between the inner ring and the outer ring, so that a dynamic inclination of the two of them against each other is made possible. Furthermore, it may be advantageous to meet the condition 17 in order to influence the axial dimensions of the wheel bearing arrangement. Moreover, this condition also influences the condition 1.

Because it is advantageously provided, in the case of a given dimensioning of the lateral joint of a universal joint shaft or of the universal joint shaft flange, to create an axially narrow design of the wheel bearing or an axial narrow design of the wheel bearing arrangement, it is also advantageous, additionally or alternatively, to realize the conditions 5 and 9 to 12, each individually, in any combination with one another, or all together.

Further advantageous embodiments of the wheel bearing arrangement according to the invention ensue from the dependent claims.

A preferred embodiment of the invention provides that the inner circumferential surface and the outer circumferential surface are parallel to each other. Additionally or alternatively, it can be provided that the outer circumferential surface is at an angle with respect to the axis of rotation. In another preferred embodiment of the invention, it can be provided that the seal mount space is delimited by the inner circumferential surface, a side surface, and a bottom surface, and has an open edge in the direction of the outer ring, in particular, the roller elements.

Another embodiment of the invention provides that the side surface lies in a plane that is perpendicular to the axis of rotation. An enhancement provides that, in addition, as viewed in the longitudinal section, the side surface and the bottom surface are connected to each other via a radius. Another preferred embodiment of the invention provides that the outer circumferential surface engages in the wheel bolt circle. Additionally or alternatively, it can be provided that a seal that is arranged in the seal mount space and, in particular, is clamped at the outer ring, has, as viewed in the longitudinal section, a first sealing lip resting against the side surface, a second sealing lip resting against the bottom surface, and (optionally) at least one clamp fastening, which preferably rests against the outer ring. Additionally, at least one additional sealing lip can rest against one of the mentioned surfaces or against a surface that differs from them. In addition, a plurality of additional sealing lips that rest against the same surface or different surfaces may be present.

Another embodiment of the invention provides that the wheel bearing is designed as a multi-row roller bearing. Finally, it is possible, in the scope of another embodiment of the invention, to provide that, on the side of the wheel flange that lies opposite to the support surface in the axial direction, at least one axial projection is formed continuously or at least in part continuously in the circumferential direction.

BRIEF DESCRIPTION

The invention will be explained in detail below on the basis of the exemplary embodiments illustrated in the drawing, without any limitation of the invention resulting therefrom. Shown herein are

DETAILED DESCRIPTION

Figure 1:
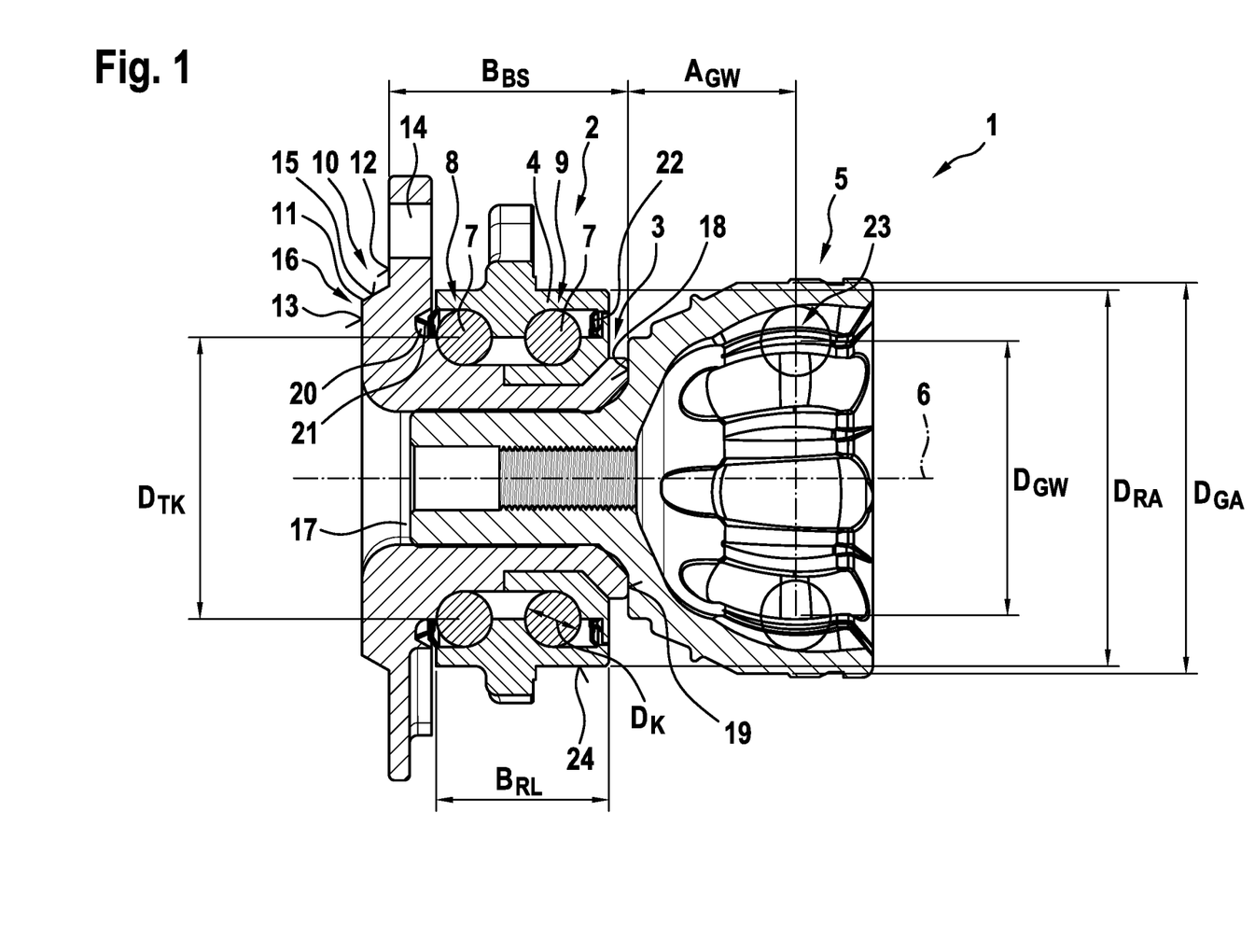
FIG. 1 a longitudinal sectional illustration of a part of a wheel bearing arrangement for a motor vehicle, FIG. 2 a front-side view of the wheel bearing arrangement, FIG. 3 a first detailed sectional illustration through the wheel bearing arrangement, and FIG. 4 a second detailed sectional illustration through the wheel bearing arrangement.

FIG. 1 shows a longitudinal sectional illustration through a region of a wheel bearing arrangement 1, of which, in particular, a wheel bearing 2 and a wheel hub 3 are illustrated. The wheel bearing 2 is equipped with an outer ring 4. Further illustrated is a universal joint shaft flange 5. The longitudinal section through the wheel bearing arrangement 1 is present along an axis of rotation 6 of the wheel hub 3, in particular with respect to the outer ring 4. The wheel bearing 2 is designed as a roller bearing, so that, between an inner ring of the wheel bearing 2 and the outer ring 4, there are roller elements 7.

In the exemplary embodiment illustrated here, the inner ring is designed to be integrated in the wheel hub 3, so that the wheel hub 3 itself has a running surface for one or a plurality of the roller elements 7. Obviously, however, the inner ring can be designed to be separate from the wheel hub 3. In addition to the inner ring, another inner ring, which is not indicated in more detail, is provided, which also has a running surface for at least one or for a plurality of the roller elements 7, in particular for a row of roller elements 7. The additional inner ring is fixed at the wheel hub 3 through the creation of a roller rivet shoulder at the wheel hub 3. The roller rivet shoulder is produced by a widening of the wheel hub 3 in the radial direction.

The inner ring and the wheel hub 3 arranged at it or fastened to it are arranged in the outer ring 4. However, the wheel hub 3 protrudes out from said outer ring in the axial direction. The region of the wheel hub 3 that comes through the outer ring 4 in the axial direction extends outward in the radial direction, so that, as viewed in the longitudinal section, it engages over the outer ring 4 in the radial direction, at least partially or, in the exemplary embodiment illustrated here, completely, that is, it is present at least partially adjacent to the outer ring 4 in the axial direction. In this regard, the mentioned region serves as a wheel flange and for fastening of the wheel at the wheel hub.

The roller bearing is present as a multi-row roller bearing, so that the roller elements 7 are divided into two roller element rows 8 and 9, which are spaced apart from each other in the axial direction with respect to the axis of rotation 6. The outer ring 4 of the wheel bearing 2 can preferably be fastened at a wheel mount of a motor vehicle. At the wheel flange and consequently at the wheel hub 3, in contrast, it is possible to fasten a brake disk and to attach a wheel of the motor vehicle, wherein the attachment of the wheel at the wheel hub 3 is made by way of the wheel flange.

For mounting the brake disk, which is not illustrated here, the wheel flange is equipped with a brake disk mount 10, which is formed by a recess 11 of the wheel flange. The brake disk mount 10 preferably overlaps, as viewed in the radial direction, the outer ring 4, at least in regions thereof. The brake disk mount 10 is delimited, in the axial direction in the direction of the outer ring 4 or the roller elements 7, by a support surface 12, which serves for lying against or supporting the brake disk in the axial direction. In this case, the support surface 12 is present on the outer ring 4 on the side facing away from the wheel flange in the axial direction. The support surface 12 is preferably displaced in the axial direction in the direction of the outer ring 4 in comparison to a front-side surface 13 of the wheel flange. However, the support surface 12 and the front-side surface 13 can be arranged parallel to each other or can each lie completely in planes that are parallel to each other.

The support surface 12 is perforated by at least one wheel bolt hole 14, which serves for receiving a wheel bolt for fastening the wheel or the wheel hub 3.

Through the recess 11, an outer circumferential surface 15 of the wheel flange forms a brake disk seat 16 for support of the brake disk in the radial direction with respect to the axis of rotation 6. However, this is optional. The brake disk can also be centered by way of an outer diameter. The outer circumferential surface 15 is preferably completely flat and is at an angle with respect to the support surface 12, that is, encloses with said support surface an angle that is greater than 0° and less than 180°. Preferably, in this case, the angle is greater than 90° and less than 180°.

It was already mentioned above that the wheel bearing arrangement 1 is equipped with the universal joint shaft flange 5, which is arranged in a central flange mount 17 of the wheel hub 3 and is preferably coupled to the wheel hub 3 in a form-fitting manner and/or in a force-fitting manner. In the axial direction, the universal joint shaft flange 5 is supported with a flange front-side surface 18 at a wheel hub front-side surface 19 of the wheel hub 3 or of the roller rivet shoulder, that is, rests against them, in particular over the entire surface. The flange front-side surface 18 and the wheel hub front-side surface 19 of the wheel hub 3 or of the roller rivet shoulder in this case are each flat, at least in regions thereof, and rest against each other with their flat areas after the wheel bearing arrangement 1 has been mounted. It can be seen that the wheel hub 3 is delimited in the axial direction, on the one hand, by the front-side surface 13 and, on the other hand, by the wheel hub front-side surface 19 of the wheel hub 3, in particular the roller rivet shoulder of the wheel hub 3. In this way, they define the maximum extension of the wheel hub 3 in the axial direction.

The wheel flange has, on its side facing the outer ring 4, a seal mount space 20, in which a seal 21 is arranged. The seal 21 rests, on the one hand, in particular so as to be able to rotate or so as to rotate, against the wheel flange in a sealing manner, and, on the other hand, in particular, is rotationally fixed against the outer ring 4 in a sealing manner, so that the wheel bearing 2 is reliably sealed against its outer surroundings. Another seal 22 is arranged on the side of the wheel bearing 2 facing away from the seal 21 in the axial direction, namely, on the side of the roller elements 7 that lies opposite to the seal 21.

It can be seen that, between the flange front-side surface 18 and an articulation point of the universal joint shaft flange 5, a universal joint shaft flange distance $A_{GW}$ exists. Furthermore, between the support surface 12 and the wheel hub front-side surface 19 of the wheel hub 3, in particular of the roller rivet shoulder, a standard bearing width $B_{BS}$ is provided. It is clear that, for a mounted wheel bearing arrangement 1, the universal joint shaft flange distance $A_{GW}$ and the standard bearing width $B_{BS}$ directly adjoin each other in the axial direction; that is, they have a common border. Furthermore, it is clear that the outer ring 4 has an outer ring width $B_{RL}$.

The universal joint shaft flange 5 has, on the outer side, a universal joint shaft flange diameter $D_{GA}$. In addition, it is furnished with a spherical circle diameter $D_{GW}$. The outer ring 4 has a wheel bearing outer diameter $D_{RA}$. This outer diameter refers to the diameter of a seat surface 24 that can be arranged in a seat of the wheel mount, which is not illustrated here, and accordingly supports the wheel bearing 2 or the outer ring 4 in the radial direction with respect to the wheel mount. The roller elements 7 of the wheel bearing 2 are arranged with their respective center of rotation on a pitch circle with a pitch circle diameter $D_{TK}$. The roller elements 7 themselves have a roller element diameter $D_K$.

Figure 2:
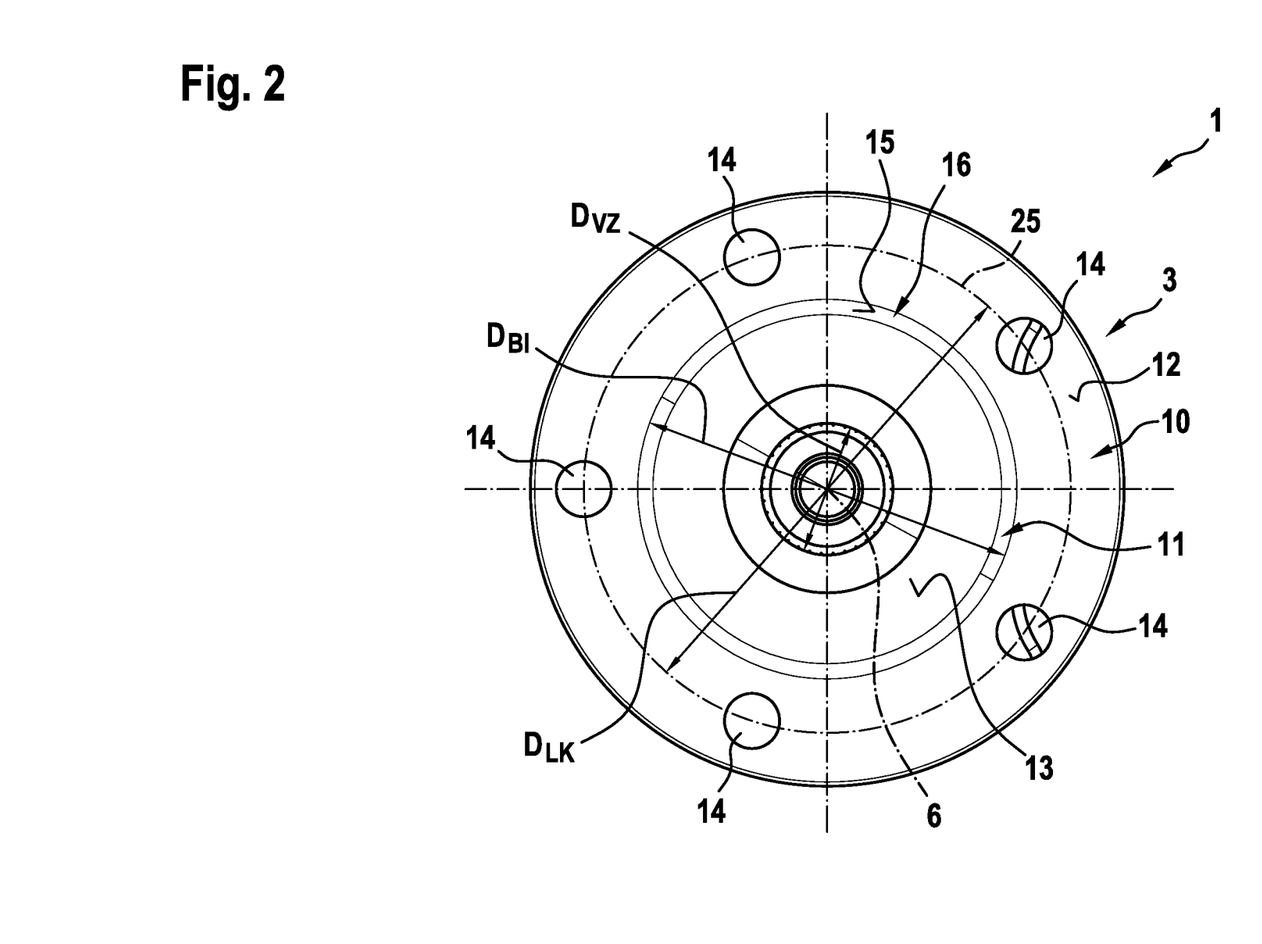

FIG. 2 shows a plan view of the wheel bearing arrangement 1 in the axial direction, namely, in the direction of the wheel bearing 2, of which here only a part of the wheel hub 3 and the wheel flange can be seen. It is clear that a plurality of wheel bolt holes 14 are provided, which preferably are arranged in uniform distribution in the circumferential direction. The wheel bolt holes 14 are arranged along a wheel bolt circle 25, which has a wheel bolt circle diameter $D_{LK}$. The brake disk seat 16 has a brake disk seat diameter $D_{BI}$ with respect to the axis of rotation 6, with this diameter preferably being determined at the point at which the outer circumferential surface 15 of the brake disk seat 16 transitions into the support surface 12. In the flange mount 17, the wheel hub 3 has a toothing, which is not illustrated here in detail and has a toothing diameter $D_{VZ}$, which is indicated here.

Figure 3:
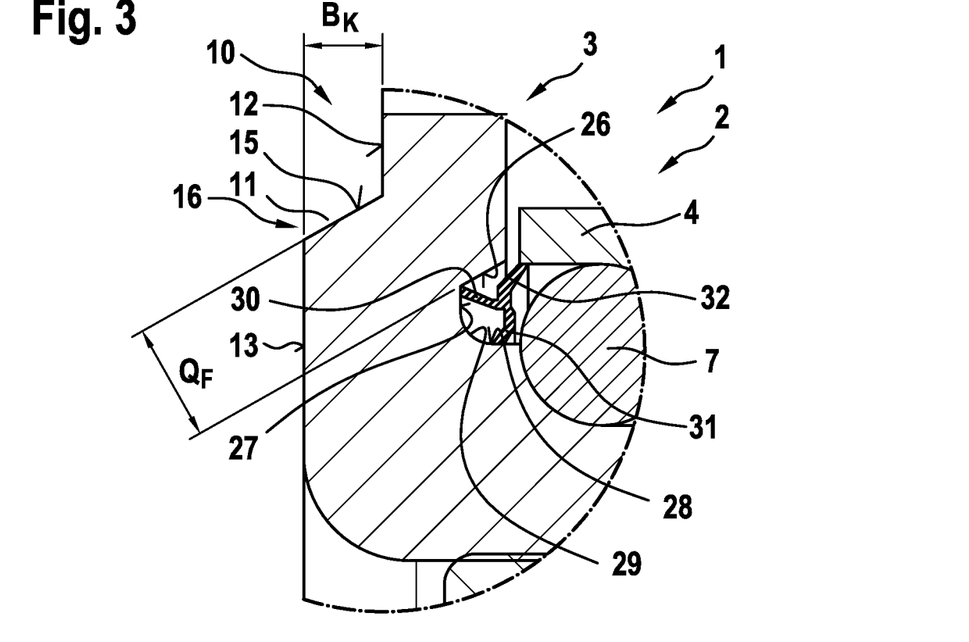

FIG. 3 shows a detailed sectional illustration of a region of the wheel bearing arrangement 1, namely, on the one hand, through the wheel bearing 2, of which the inner ring, the outer ring 4, and one of the roller elements 7 can be seen. On the other hand, the wheel hub 3 and the wheel flange are illustrated. Clearly to be seen is the seal mount space 20 with the seal 21*. The seal mount space 20 is delimited by an inner circumferential surface 26, a side surface 27, and a bottom surface 28. It is designed to have an open edge in the direction of the outer ring 4; that is, it is present essentially as a channel or groove in the wheel flange.

Preferably, the side surface 27 is arranged at least partially and, in particular, completely in a plane that is perpendicular to the axis of rotation 6. It can be provided that the side surface 27 and the bottom surface 28 are connected to each other via a radius 29 or a curvature. The seal 21 is equipped with a first sealing lip 30, a second sealing lip 31, and a clamp fastening 32. The first sealing lip 30 rests against the side surface 27, the second sealing lip 31 rests against the bottom surface 28, and the clamp fastening 32 rests against the outer ring 4, in each case in a sealing manner.

It can be seen that the recess 11 has a cranking width $B_K$, which preferably defines the distance between the support surface 12 and the front-side surface 13 in the axial direction. Furthermore, it is clear that the outer circumferential surface 15, which can form the brake disk seat 16, is spaced apart from the inner circumferential surface 26 by a flange cross section $Q_F$. More preferably, the inner circumferential surface 26 and the outer circumferential surface 15 in this case are parallel to each other, in particular continuously parallel. The outer circumferential surface 15 here is at an angle with respect to the axis of rotation 6, that is, it encloses with the axis of rotation, in the longitudinal section illustrated here, an angle that is greater than 0° and less than 180°.

Figure 4:
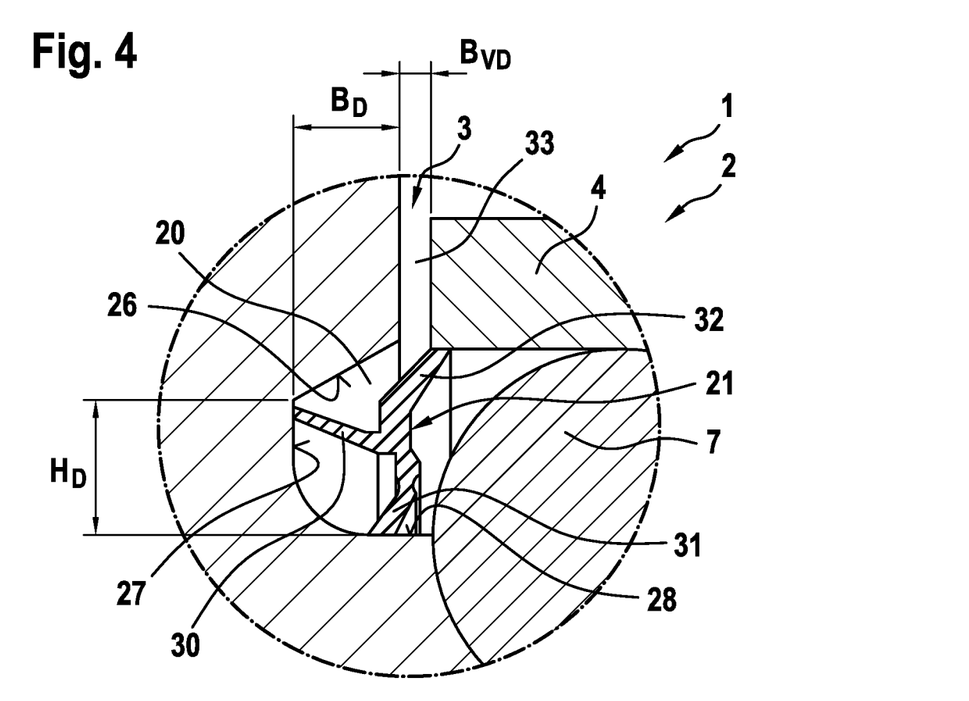

FIG. 4 shows another detailed sectional illustration of the wheel bearing arrangement 1. It can be seen that the seal mount space 20 has a seal mount spatial height $H_D$. This defines preferably the distance between the bottom surface 28 and the inner circumferential surface 26, namely, the smallest distance that is present in the longitudinal section. Furthermore, a seal mount spatial width $B_D$, which defines the width of the seal mount space 20 in the axial direction, can be seen. Preferably, the seal mount spatial width $B_D$ corresponds to the extension of the inner circumferential surface 26 in the axial direction, in particular as viewed in the longitudinal section. Adjoining the seal mount space 20 is an air gap 33 with an air gap width $B_{VD}$. The air gap 33 is present between the wheel flange and the outer ring 4 in the axial direction in regions thereof, namely, extending from the seal mount space 20 outward in the radial direction, preferably continuously.

For the mentioned dimensions and variables, more preferably the values already mentioned in the introduction are applicable. If the conditions that are also described in the introduction are met and these values thus lie within the respectively described range of values, then the seal 21 can be integrated into the wheel flange in a straightforward manner, namely, in the way presented. Accordingly, an extremely compact wheel bearing arrangement 1 can be created.

The invention claimed is:

1. A wheel bearing arrangement for a motor vehicle, comprising:
   a wheel hub and a wheel bearing for the rotatable bearing of the wheel hub at a wheel mount, wherein the wheel bearing has an outer ring and an inner ring, which is rotatable with respect to the outer ring around an axis of rotation and is connected to the wheel hub, wherein a wheel flange extends from the wheel hub and, as viewed in the axial direction, has a brake disk mount, which is open in the direction facing away from the outer ring and, as viewed in the longitudinal section with respect to the axis of rotation, is formed by a recess of the wheel flange, and has a support surface for a brake disk, wherein in the wheel flange on its side facing the outer ring in the axial direction, a seal mount space is formed, which, in the axial direction, has a seal mount width ($B_D$) which is greater than or equal to 2.0 mm, wherein the recess, as viewed in longitudinal section, has a cranking width ($B_K$) which is greater than or equal to 5.0 mm, wherein by way of the recess, an outer circumferential surface of the wheel flange forms a brake disk seat, which, with respect to the axis of rotation, has a brake disk seat diameter ($D_{BI}$), wherein the outer ring has an outer ring width ($B_{RL}$), and wherein the ratio of the brake disk seat diameter ($D_{BI}$) to the outer ring width ($B_{RL}$) is greater than or equal to 1.9.

2. The wheel bearing arrangement according to claim 1, wherein at the wheel hub, a universal joint shaft flange is fastened, which has a flange front-side surface for resting against a wheel hub front-side surface of the wheel hub, wherein, between the flange front-side surface and an articulation point of the universal joint shaft flange in the axial direction, a universal joint shaft flange distance ($A_{GW}$) is present and/or
   between the inner-lying end of the wheel hub of the vehicle, in particular between the wheel hub front-side surface, and the support surface in the axial direction, a standard bearing width ($B_{BS}$) is present
   and/or wherein
   at the seal mount space, there is an adjoining air gap, which, as viewed in the longitudinal section, has an air gap width ($B_{VD}$) and is present between the wheel flange and the outer ring in the axial direction extending from the seal mount space continuously outward in the radial direction, and/or wherein
   the universal joint shaft flange has, on its outer side, a universal joint shaft flange diameter ($D_{GA}$) and/or wherein
   the universal joint shaft flange has a spherical circle diameter ($D_{GW}$), and/or wherein
   the outer ring has a wheel bearing outer diameter ($D_{RA}$), and/or wherein
   roller elements of the wheel bearing are arranged with their respective center of rotation on a pitch circle with a pitch circle diameter ($D_{TK}$), and/or wherein
   the wheel hub in a flange mount for the universal joint shaft flange has a toothing with a toothing diameter ($D_{VZ}$), and/or wherein
   the seal mount space has a seal mount spatial height ($H_D$), and/or wherein
   the outer circumferential surface is spaced apart from an inner circumferential surface, which delimits the seal mount space outward in the radial direction, by a flange cross section ($Q_F$), and/or wherein
   at the wheel flange at least one fastening mount is arranged on a wheel bolt circle with a wheel bolt circle diameter ($D_{LK}$).

3. The wheel bearing arrangement according to claim 2, wherein
   the ratio of the universal joint shaft flange distance ($A_{GW}$) to the standard bearing width ($B_{BS}$) is greater than or equal to 0.5, and/or the ratio of the sum of the universal joint shaft flange distance ($A_{GW}$) and the standard bearing width ($B_{BS}$) to the wheel bolt circle diameter ($D_{LK}$) is less than or equal to 1.0, and/or the ratio of the sum of the universal joint shaft flange distance ($A_{GW}$) and the standard bearing width ($B_{BS}$) to the toothing diameter ($D_{VZ}$) is greater than or equal to 2.5, and/or the ratio of the sum of the universal joint shaft flange distance ($A_{GW}$) and the standard bearing width ($B_{BS}$) to the pitch circle diameter ($D_{TK}$) is greater than or equal to 1.2, and/or the ratio of the universal joint shaft flange distance ($A_{GW}$) to the pitch circle diameter ($D_{TK}$) is less than or equal to 0.6, and/or the ratio of the brake disk seat diameter ($D_{BI}$) to the pitch circle diameter ($D_{TK}$) is greater than or equal to 1.2, and/or the ratio of the brake disk seat diameter ($D_{BI}$) to the toothing diameter ($D_{VZ}$) is greater than or equal to 2.5, and/or the ratio of the universal joint shaft flange diameter ($D_{GA}$) to the wheel bearing outer diameter ($D_{RA}$) is greater than or equal to 0.8, and/or the ratio of the universal joint shaft flange diameter ($D_{GA}$) to the pitch circle diameter ($D_{TK}$) is greater than or equal to 1.2, and/or the ratio of the spherical circle diameter ($D_{GW}$) to the pitch circle diameter ($D_{TK}$) is greater than or equal to 0.7, and/or the ratio of the spherical circle diameter ($D_{GW}$) to the toothing diameter ($D_{VZ}$) is greater than or equal to 1.8, and/or the ratio of the wheel bolt circle diameter ($D_{LK}$) to the outer ring width ($B_{RL}$) is greater than or equal to 2.0, and/or wherein the ratio of the wheel bolt circle diameter ($D_{LK}$) to the pitch circle diameter ($D_{TK}$) is greater than or equal to 1.4, and/or the ratio of the wheel bolt circle diameter ($D_{LK}$) to the toothing circle diameter ($D_{VZ}$) is greater than or equal to 3.3, and/or the air gap width ($B_{VD}$) is less than or equal to 2.0 mm, and/or the flange cross section ($Q_F$) is greater than or equal to 6.0 mm.

4. The wheel bearing arrangement according to claim 3, wherein the inner circumferential surface and the outer circumferential surface are parallel to each other.

5. The wheel bearing arrangement according to claim 3, wherein the outer circumferential surface is at an angle with respect to the axis of rotation.

6. The wheel bearing arrangement according to claim 3, wherein the seal mount space is delimited by the inner circumferential surface, a side surface, and a bottom surface, and has an open edge in the direction of the outer ring.

7. The wheel bearing arrangement according to claim 3, wherein the side surface lies in a plane that is perpendicular to the axis of rotation.

8. The wheel bearing arrangement according to claim 3, wherein the side surface and the bottom surface, as viewed in the longitudinal section, are connected to each other via a radius.

9. The wheel bearing arrangement according to claim 3, wherein a seal, which is arranged in the seal mount space, has, as viewed in the longitudinal section, a first sealing lip, which rests against a side surface, a second sealing lip, which rests against the bottom surface, and a clamp fastening, which rests against the outer ring.

10. The wheel bearing arrangement according to claim 3, wherein the wheel bearing is designed as a multi-row roller bearing.

* * * * *